United States Patent [19]

Dubois

[11] 4,029,496

[45] June 14, 1977

[54] PROCESS FOR THE REDUCTION OF IRON MINERAL

[75] Inventor: Ernest Dubois, Lausanne, Sweden

[73] Assignee: Etudes et Recherches Industrielles et Metallurgiques - ERIM, Lausanne, Switzerland

[22] Filed: June 30, 1975

[21] Appl. No.: 592,089

Related U.S. Application Data

[63] Continuation-in-part of Ser. No. 403,838, Oct. 5, 1973, abandoned.

[52] U.S. Cl. .......................... 75/35; 75/26; 75/34; 75/91
[51] Int. Cl.² ................................ C21B 13/02
[58] Field of Search ............... 75/34, 35, 91, 26

[56] References Cited
UNITED STATES PATENTS 3,427,013  2/1969  Cavanagh ........................ 75/90

FOREIGN PATENTS OR APPLICATIONS 1,288,252  9/1972  United Kingdom ............... 75/35

*Primary Examiner*—M. J. Andrews
*Attorney, Agent, or Firm*—Cameron, Kerkam, Sutton, Stowell & Stowell

[57] ABSTRACT

Iron minerals are reduced in solid state in a vertical shaft furnace by gases produced in the furnace fed at the top with a mixture of minerals and solid reducing material. A combustion gas including oxygen is injected at low velocity and in finely divided form in the medial part of the furnace. Combustion gases produced in the furnace transfer heat as determined by the combustion with oxygen and are removed at the top of the furnace and recycled to the bottom of the furnace. The amounts of materials, the amounts of gases aspirated and the amounts of oxygen are adjusted so that the gases and materials leaving the top of the furance and in the bottom of the furnace are at low temperature.

8 Claims, 5 Drawing Figures

PROCESS FOR THE REDUCTION OF IRON MINERAL

REFERENCE TO RELATED APPLICATION

This application is a continuation-in-part of my application Ser. No. 403,838 filed Oct. 5, 1973 now abandoned.

BACKGROUND OF THE INVENTION

The present invention relates to a process and installation for the reduction of iron minerals.

Numerous processes are known for obtaining the reduction of iron minerals.

A comparison of the respective interests of these different processes, is taken purely from the industrial point of view which is normally the only consideration, turns on the costs of preparing the reduced minerals.

From this point of view, the process of reduction in accordance with the present invention, as will appear from the following description, is most advantageous because it has a very high energy yield; it utilizes as the reducing agent reducing gases generated entirely or in part by the furnace itself from cheap material; and it provides, in certain embodiments of the process as a by-product of the reduced mineral, useful materials whose value improves the cost of the reduction operation.

The process in accordance with the present invention carries out the reduction using CO or a mixture of CO and hydrogen.

The laws regulating the chemical equilibrium are known when such reducing gases are mixed with the iron mineral at high temperature.

The reducing power of the gases is defined by the following expression:

$$\frac{(H_2) + (CO)}{(H_2) + (H_2O) + (CO) + (CO_2)}$$

in which, for example, $(H_2)$ is the number of molecules of hydrogen per unit of volume. Further, it is known that to be able to recuce the minerals to iron at a temperature on the order of 1000° C., the reducing power of the gases should be greater than 70%.

The assignee of the present invention and application has commercialized for a long time a type of shaft furnace called "FOUR ERIM" as disclosed in French Patent No. 885,257. Such a furnace will be considered hereinafter with respect to the discussion of the present invention.

This furnace has an exterior shell provided at its upper part with charging apparatus for carbon, as an example. A duct removes gas at the upper part of the furnace and a ventilator circulates the gases from the upper part of the furnace to the base of the furnace, a part of the gases removed at the upper part being evacuated to the exterior.

In an intermediate zone between the upper and lower parts of the furnace, air is injected into the furnace.

There is a partial combustion of the gases and carbon in the intermediate zone. The gases of combustion pass through the column of carbon above the intermediate zone exchanging their heat with that carbon and coming to a slightly elevated temperature in the upper part of the furnace. They are injected into the base of the furnace at slightly elevated temperature.

During ascent in the lower part of the furnace the gases are heated while cooling the solid materials through which the pass.

This known type of furnace is used to coke carbon to manufacture a combustible gas from carbon to fabricate coked pellets from carbon or a mixture of carbon and oxygen for use in a blast furnace and the like.

SUMMARY OF THE INVENTION

The present invention relates to a reduction process for iron minerals utilizing a furnace of this type under such conditions that a reduction of the minerals is carried out to the iron phase.

The process of the present invention is characterized in that the furnace is charged in a semi-continuous manner at its upper part with a mixture of combustible solids and iron mineral and, in the middle portion of the furnace, finely divided oxygen is injected at low velocity with respect to that of the gas circulating from the bottom to the top of the furnace.

As has been noted above, to reach the reduction phase it is necessary to have a sufficiently high reducing power which, in fact, is greater than the reducing power obtained by the furnace above-described.

The present invention provides a combination of means which will now be described in more detail referring to several embodiments of the invention which are given by way of example and not as a limitation of the invention and represented in the accompanying drawings.

BRIEF DESCRIPTION OF THE DRAWINGS

In these drawings,

FIG. 1 shows schematically the circuit of materials and of the gases and the different zones that can be distinguished within the furnace. However, FIG. 1 shows an assembly of components all of which cannot be utilized simultaneously. For this reason the description of the preferred embodiment of the present invention will be made with reference to FIG. 3.

Figure 2:
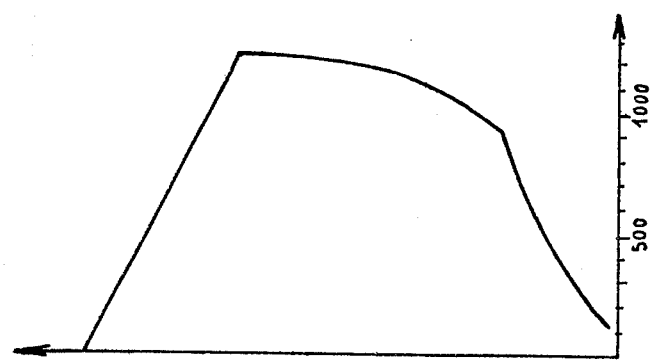
FIG. 2 is a temperature diagram of the temperatures of the material circulating in the furnace.

The furnace utilized for carrying out the present invention includes an exterior casing 1 having a vertical axis and with an interior refractory lining.

Vertical shaft furnaces have been known for a long time. For this reason, in view of the special operating conditions which are the object of the present invention and which will be described hereinafter, one skilled in the art will be able to determine the dimensions of the furnace which will primarily provide the thermal equilibriums necessary in the upper and lower exchangers and in the medial zone. Normally, the height of the furnace could be on the order of 1.2 to 1.5 times the diameter.

The medial zone of the furnace has a diameter slightly smaller than that of the furnace. In the upper zone, there will normally be used an annular feed 10 for charging the furnace with the different products in the central part and along the refractory lining. These products will be charged by a central chute 11 and a lateral chute 12 passing through a cap 13 at the top of the furnace, this cap being so divided as to separate, in case of need, the gases leaving the central part and the gases leaving the lateral parts of the furnace.

Along the length of the furnace, an upper zone I, a medial zone II and a lower zone III are shown. The upper and lower zones function as heat exchangers between the solids and gases. Medial zone II is the reduction zone.

In accordance with an essential characteristic of the present invention, oxygen is introduced into the furnace in divided form over the entire periphery and the entire height of zone II. This can be done by utilizing a large number of injectors for passing the oxygen into the furnace or through small refractory tubes or through a porous wall.

Figure 3:
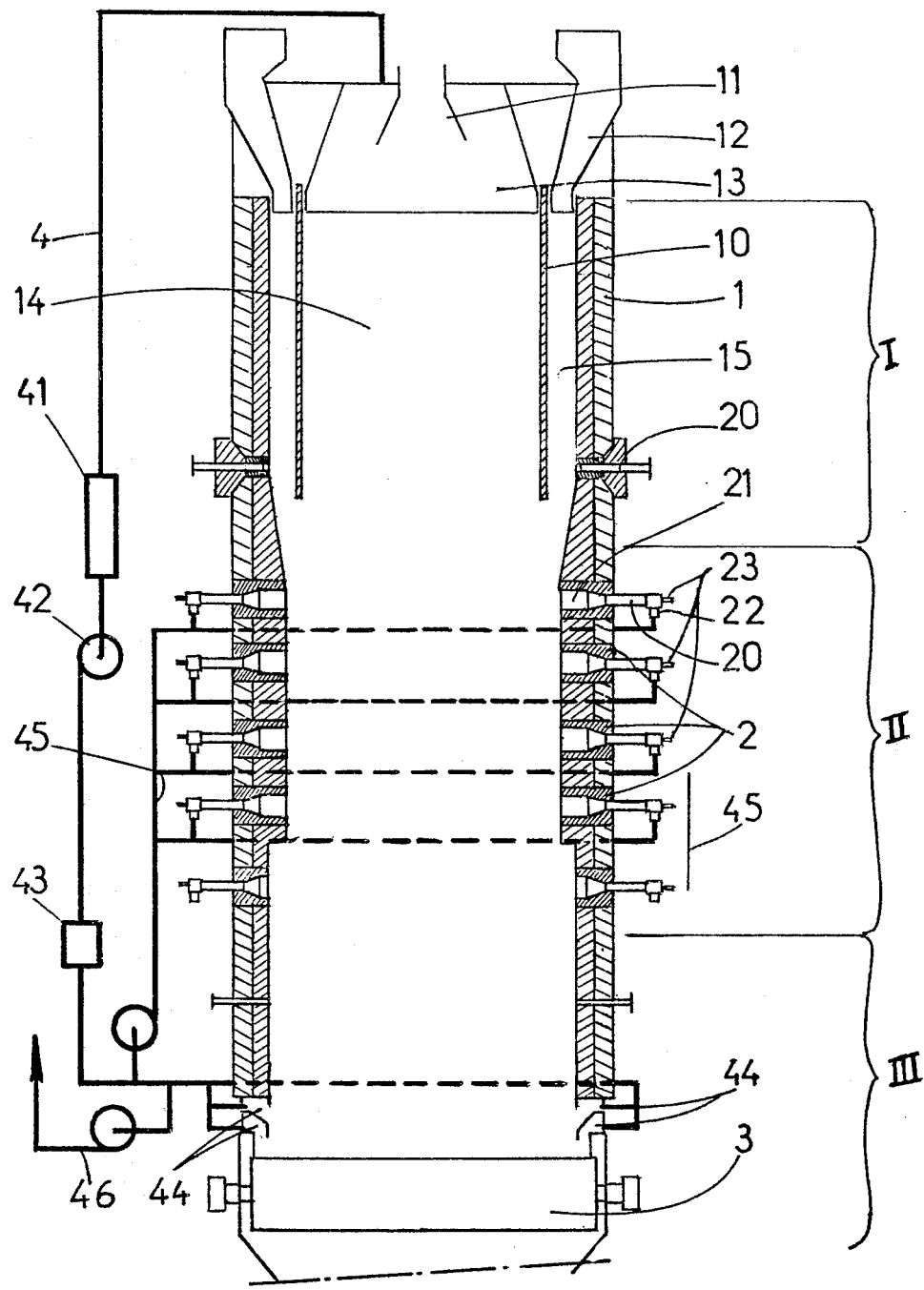
FIG. 3 is a schematic cross-section of an embodiment of a furnace in accordance with the present invention.

In the embodiment of FIG. 3, a plurality of burners 2 are distributed on the periphery of the furnace and over the height of the medial zone.

The relative heights of the different zones depend on the operating conditions and primarily on the manner of charging as will be described hereinafter. For this reason in the construction, the orifices for the injection of oxygen will be located over a large height of the furnace and the injectors can be adjusted individually in such a way as to determine the height of the zone of injection for the oxygen, as required. However, the height of the medial zone should be between 1/5 and 1/3 of the total height of the furnace.

In the embodiment shown in FIG. 3, each burner 2, includes a first cylindrical chamber 20 connected by a conical enlargement to a second cylindrical chamber 21 of much larger diameter opening into the interior of the furnace. A conduit 22 opens into the input of the first chamber 20 for the feed of recycled gases and a tube 23 of smaller diameter located in the axis of chamber 20 is utilized to introduce oxygen. Thus, the oxygen and the recycled gas mix in the first chamber 20, combustion develops in second chamber 21 and the burner thus produces a soft flat flame the use of which will be described hereinafter.

The base of the furnace is closed by structure 3 for continuous removal of the materials treated in the furnace.

The gases received in cap 13 from the central part of the furnace are recycled through an exterior circuit 4 including a washer 41, a ventilator 42 and a gas separator 43 for the carbonic gas. The gases thus treated are reintroduced at the bottom of the furnace through orifices 44. However, a branch conduit 45 takes a part of the gases to the assembly of burners 2. Normally, burners 2 are disposed in superposed horizontal rings and a ventillator is located upstream of conduits 45 to pressurize the gas introduced by the burners.

Figure 1:
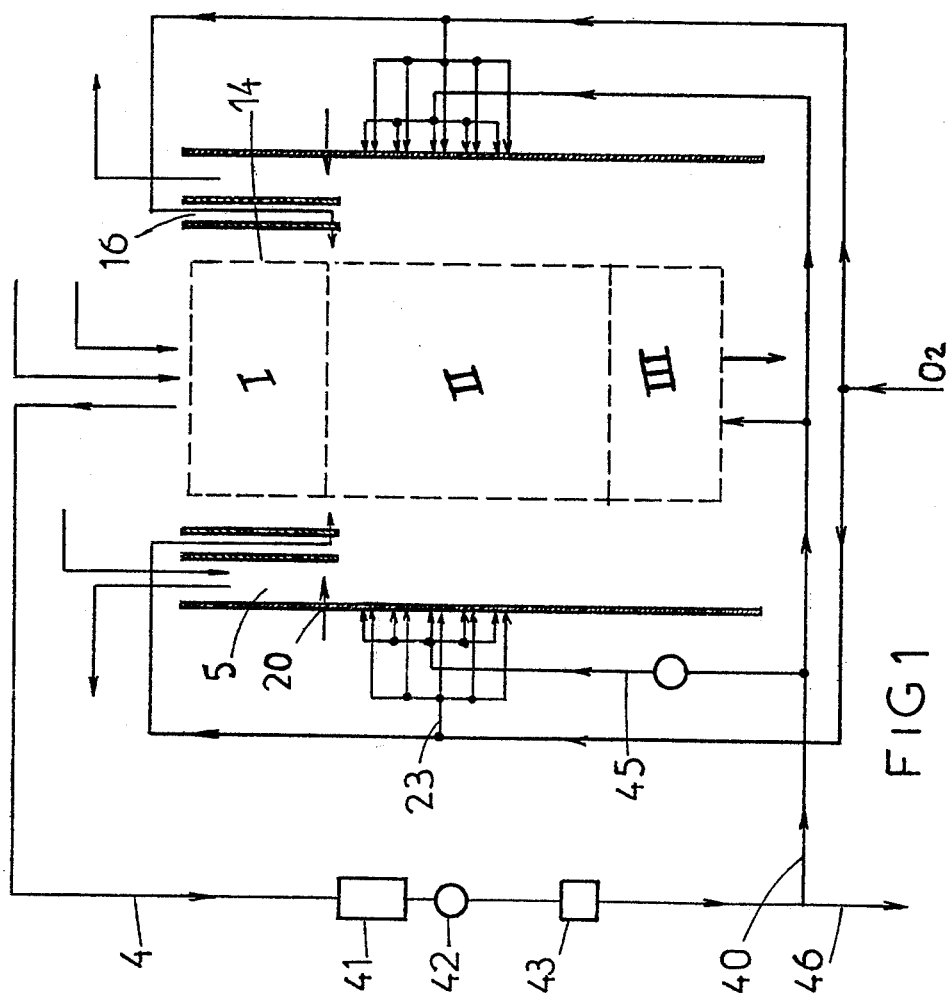
FIG. 1 is a schematic view of a furnace of the present invention.

The functioning of the furnace is schematically illustrated in FIGS. 1 and 2. It has already been noted that in the three superposed zones of the furnace there is an upper exchanger I, the heating and reduction zone II and the lower heat exchanger III.

An important characteristic of the invention is in the regulation of the heat exchangers and the thermal distributions in such a way that the charge remains solid during its movement in the furnace with reduction occurring directly without fusion of the iron. Further, the materials circulate by gravity from top to bottom and the gases pass through the materials from bottom to top.

An essential concept of the process of the present invention is the production at the same time in the furnace both of the reducing gases and the thermal energy necessary for the carrying out of the reduction.

In the most simple construction, the furnace is charged by chute 11 (FIG. 3) with a mixture of iron mineral in particles and fuels having high quantities of volatile materials, normally dry flamable carbon. As will be seen hereinafter, the gases circulating in the furnace are brought in the central zone to a temperature on the order of 1050° C. In descending in the furnace, the materials are thus reheated in contact with the gases which are cooled. The amount of feed of materials and the amount of aspiration of the gases can be regulated in such a way that the thermal exchangers are in equilibrium, the colorific mass of the gases being substantially equal to the calorific mass of the solid materials.

It will be seen hereinafter that an injection of oxygen can also be carried out in the upper part of the furnace to regulate the level of temperature in this area. The gases can therefore transfer the greatest part of their heat to the materials and leave the furnace at a relatively low temperature, normally below 400°.

A distillation of the carbon occurs, the volatile materials separate and mix with the ascending gases from reduction zone II. The separation of the volatile materials, which is very useful in certain applications as in a blast furnace, is here favorable because it enriches in hydrocarbons the gases which are recycled to the bottom of the furnace and to the burners. Further, the distillation of the carbon in the preheating zone produces an impregnation of the mineral which, in the reduction zone, decreases the risk of adherence of the mineral particles.

The gases are collected at the top of the furnace and are subjected to a special treatment for removal of pitch and then they are recycled to the bottom of the furnace through tuyeres 44.

A vent 46 allows for the evacuation of excess gases. It is therefore possible in view of the amount of gas directed to the burners to regulate the amount of the gases injected at the lower part of the furnace, which are reheated while rising in the furnace while cooling the materials leaving the reduction zone, in such a way that the materials leaving the furnace have a temperature less than 100°, the gases entering the furnace having a temperature less than 100°, generally on the order of 60°. Here again, the amount of gas is adjusted in such a way that the thermal exchangers are in equilibrium and so that the gases arriving in reduction zone II have a temperature on the order of 900°. During the increase in temperature, the cracking of the hydrocarbons occurs produced by the distillation of the carbon which enriches the recycled gases in hydrogen. Thus the gases arriving in the reduction zone are constituted essentially of carbon monoxide and hydrogen. By utilizing combustible carbon having high amounts of volatile material the proportions can be on the order of ¼ to ⅓ $H_2$ for ¾ to ⅔ CO. The following reduction reactions are $$Fe_2O_3 + 3CO = 3CO_2 + 2Fe + 7,9 \text{ Kcal}$$

$$Fe_2O_3 + 3H_2 = 3H_2O + 2Fe - 21,8 \text{ Kcal}$$

It is seen that with the compositions obtained by the present invention, notably from the fact of the distillation of the carbon, the reduction of the iron oxide can occur practically without application of exterior heat. The quality of heat to be introduced in the medial zone of the furnace is therefore relatively small. In accordance with a characteristic of the invention, the reduction is assured and carried out by a part of the heat from the fluid circulating in the furnace, this heat being obtained by a partial combustion of the gases by an injection of oxygen.

This result could appear surprising because this combustion results in a weakening of the reducing power of the gas which passes through the products. For this reason, up to the present time, if air or oxygen is injected, it would not be done in the reduction zone. However, it has been seen that the amount of heat and consequently the injection of oxygen can be relatively small. On the other hand, the arrangements adopted develop diffused heat even at the bottom of the mass avoiding hot spots which would cause fusion or sinters hindering the circulation of the gases while maintaining the temperature at a level such that the reducing power remains at least equal to 0.65. This can be obtained firstly by reason of the high reducing power of the gases entering the reduction zone which is on the order 95%. Further, when descending in the furnace, the carbon is progressively transformed into coke and the carbonic gas formed by the reduction can, in the presence of carbon and at the temperatures attained, be transformed into carbon monoxide. To this end, the temperature at the top of the reduction zone should be on the order of 1150°.

Further, special arrangements can be adopted, which will be described hereinafter, in accordance with the manner of charging the furnace depending essentially on the qualities of the materials charged into the furnace.

The simplest method consists in charging the mineral and carbon together in the same chute 11. The discharge of the gases occurs at the center of the furnace in such a way that the mass will be completely traversed by all of the gases.

The preheating of the charge in the upper exchanger I then occurs solely by the sensible heat of the gases leaving the reduction zone II. This leads to an increased consumption of oxygen and carbon in the reduction zone as a consequence. On the other hand, an excess of rich gases becomes available.

The velocity of the recycled gases is very large as compared to that of the oxygen which should always be extremely low. The oxygen can be introduced in divided form in the reduction zone, either by tubes of small diameter or through bricks or porous plugs. The combustion of the gas circulating along the interior wall of the vessel first produces an oxydizing combustion.

It is advantageous to prevent the carbonic gas and the water vapor formed by the combustion from dilution in the reducing gas but to assure its immediate partial transformation into CO and $H_2$ by the carbon. To this end, a layer of coke is circulated along the interior wall of the furnace or a layer of solid reducing material is introduced by the annular chute 12. The coke used may be obtained at the discharge of the furnace. This coke descends with the charge and is thus preheated. At this temperature the $CO_2$ and $H_2O$ formed by combustion of the gas are reduced to CO and $H_2$ in a large amount.

The reaction with the gas is firstly:

$$CO + \tfrac{1}{2} O_2 = CO_2 + 67.7 \text{ Kcal}$$

Then in the presence of coke:

$$CO_2 + C = CO - 41.1 \text{ Kcal}$$

An analogous operation takes place with hydrogen. There is therefore introduced in the charge a volume of CO gas equal to double the volume of oxygen blown in and with transfer of 53.2 calories per molecule of introduced oxygen. This transfer of calories to the mass of materials occurs in diffuse manner without formation of hot points in the mineral.

To provide preheating of the coke charged along the wall of the furnace, it is advantageous to provide for combustion of the gas passing through this zone by means of air injected through tuyeres 22 cooled by water and located at the base of casing 10, the amount of injected air being stoichiometric.

To obtain good diffusion of the heat without hot points, an annular layer of a neutral body can be used which will not react with the refractory at the level of the injectors. Thus, the annular chute 12 can be charged with particles of calcarious rock or limestone flux which will form a protective layer along the wall of the furnace. the gases in contact with the air injected by tuyere 22 burn while passing the limestone flux and utilize their sensible heat and their calorific power for the transformation of the limestone flux into lime.

The lime can, without risk of fusion, be brought to very high temperatures and then cedes its heat to the oxygen injected in the central zone. This preheating of the oxygen still further increases the temperature of the furnace in zone II and provides very large reducing power. Further, the lime will fix the carbon monoxide for use in apparatus 43 to fix the carbon monoxide in exterior conduit 4.

When an annular layer is thus formed of limestone flux by means of chute 12, if it is not desired to complicate the upper part of the furnace, the central chute 11 is charged with a mixture of mineral and carbon. It is this intimate mixture in the central part of the furnace, the carbon being transformed into coke, which automatically feeds the reforming of the gas when the temperature is suitable. In this way, the reduction of the minerals by the CO is not blocked by the increase in the volume of $CO_2$. The envelope of lime or dolomite at high temperature then assures a fine diffusion of the heat, the reaction of the oxygen and of the gas and the elevation of temperature which results occur in a zone where mineral is not found. Consequently, the endothermic reaction of the carbonic gas formed on the coke lowers the temperature and avoids the risk of passing the fusion point of the mineral.

However, in the usual case, direct injection of oxygen into the furnace will not be utilized and the burners 2 as described above preferably will be used. Because of their shape and by reason of the fact that each burner is fed by oxygen from conduit 23 and with recycled gas from conduit 22 a soft flame will be formed which diffuses in the furnace without risk of formation of a sinter. Each burner is provided with a pyrometer which controls the temperature at the output of the burner.

Further, it is possible to separately regulate the amount of gas fed the burner and as this gas is cold, it is possible by using more than the stoichiometric amount to suitably cool the flame.

It should also be noticed that the annular layer of preheated limestone flux provides a thermal insulation of the central reduction zone which decreases the amount of calories necessary to carry out the reduction.

The utilization of a large number of burners over a large surface of the furnace, each being provided with a pyrometer, provides for precise regulation of the distributions of the calories and a quite flat temperature curve can be obtained in zone II, as seen in FIG. 2, the temperature in the central zone varying from 900° to 1200°.

When these arrangements are used and with an annular layer of limestone flux which constitutes a screen, a charge in three layers can be used. The carbon is then charged in the center, the mineral is charged in an annular zone around the carbon and a layer of limestone flux is formed along the wall of the furnace. By introducing air at the base of the body of mineral, an oxidizing preheating of the mineral is obtained only by combustion of a small part of the gases leaving the central zone II. The carbon is coked solely by the sensible heat of the remainder of the gases leaving zone II which is the greater part of these gases. These are the gases which are recycled after being enriched in volatile materials.

Figure 4:
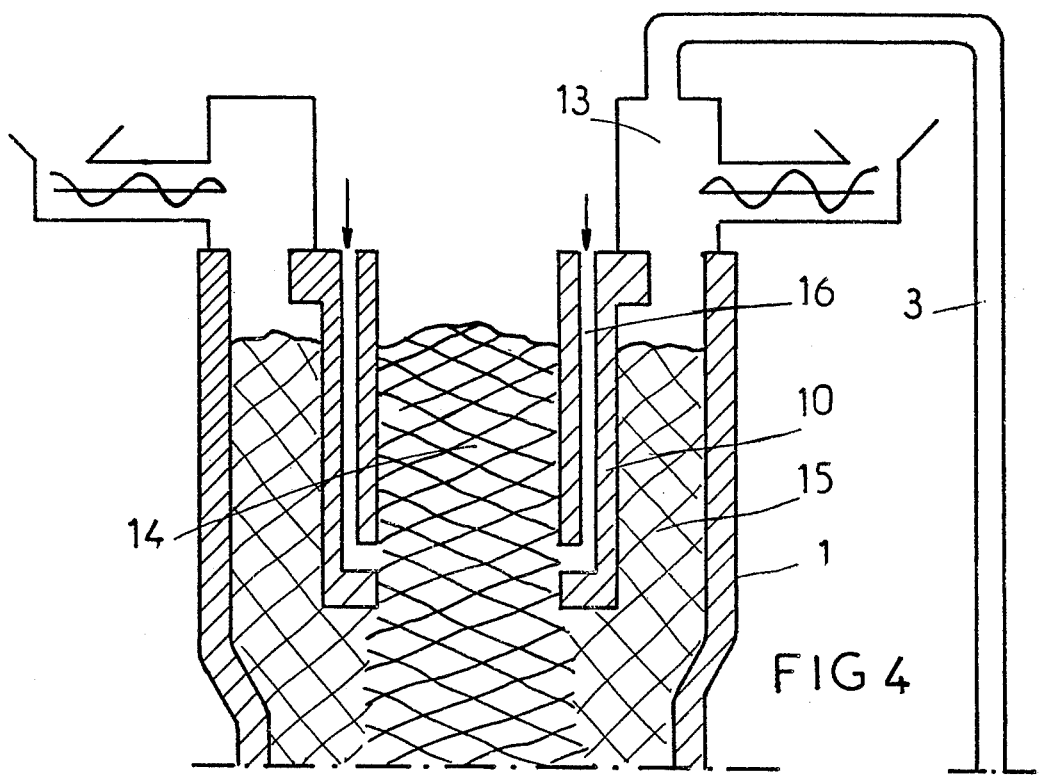
FIG. 4 is a schematic cross-section of another embodiment of a furnace of the present invention.

For the treatment of certain minerals, magnetite for example, it is desirable to begin with an oxidizing heating of the mineral to transform it into $Fe_2O_3$. In this case, the structure shown in FIG. 4 can be advantageously utilized as further shown schematically in FIG. 1. The enclosure 10 which forms the central zone 14 and the annular zone 15 of the furnace is provided with passages 16 which open at the lower part of the central zone 14. The mineral is charged in the central zone and the carbon is charged in the annular zone. Air is injected at the lower part of the central zone by tubes 16 in sufficient quantity so that the gas passing through the mineral is oxidizing. There is therefore preheating and oxidation of the minerals. In this arrangement, the recycled gases in the furnace are withdrawn above the annular part. Here again almost all of the hydrocarbons contained in the combustible solid are provided by the recycled gases. The sensible heat and the calorific power of the burned gases in the central part are employed in preheating the mineral and its oxidizing roasting.

The injection tubes formed in annular wall 10 can also be utilized in another way as shown schematically in FIG. 1. In this case, the furnace is charged in its central part by a mixture of mineral and carbon, as already indicated, the annular part being charged with limestone flux. The base of annular wall 10 includes oxygen vapor burners fed by conduit 16. In this way, after the reduction zone, there is produced in the upper part of the furnace a hot zone which transforms the $CO_2$ produced in the reduction zone. The injection of vapor doses the heat and avoids the formation of hot points which could be produced by the injection only of oxygen. By dosing the injection of vapor, regulation of temperature is obtained. Further, hydrogen is produced which inriches the recycled reducing gases at the base of the furnace.

An assembly of means has therefore been described having the combined effects which, in accordance with an essential characteristic of the invention, involved the distribution of the injection of oxygen over a large surface of the central zone avoiding point heating and regulating the distribution of temperatures in the reduction zone. Combustion with oxygen of a part of the recycled gases in the burners, as described above, adjusts the temperature of the flame. The use of an exterior ring layer of limestone flux produces a highly heated chalk screen to provide a fine diffusion of temperature in the charge to be reduced. The gases of the burners are thus in contact with a non-aggressive neutral material and further the carbonic gas thus produced can retransform rapidly to carbon monoxide without decreasing the reducing power in the charge. Finally, the oxygen vapor burner located above the reduction zone acts on the mineral carbon mixture without harming reduction.

Maintenance of temperature and of the necessary reducing power are obtained in particular by the good thermal exchange between the gases and the materials in the upper and lower exchangers. The furnace is so dimensioned that the exchanges of heat are in equilibrium. In the furnace, the mass of gas passing through the preheating zone for the solid materials is greater than the mass of gas passing through zone III for cooling the products. But on the other hand, the mass of solid materials passing through the upper exchanger I is greater than that passing through lower exchanger III. Thus a thermal equilibrium by zone can be obtained with proper dimensions of the furnace and proper regulation of the amounts of gas and of materials so that in each zone the calorific mass of the gases is substantially equal to the calorific mass of the solids.

In lower exchanger III the volume of circulation is regulated of the gases introduced at the base of the furnace, the remainder of the recycled gases being directed toward intermediate burners II where they mix with pure oxygen, excessive gas being removed.

The central zone and the annular zone are to be distinguished for upper exchanger I. In the annular zone charged with limestone flux, the quantity of gases is regulated by the speed of extraction of a ventilator for this zone. This gas is burned with air. The balance of the gases pass in the central zone charged with carbon and mineral to preheat the materials. The speed of extraction of the gases can be regulated as well as the temperature by means of burners utilizing oxygen-vapor as described above.

By way of example, the amounts and temperatures as follows have been used in a furnace such as shown in FIG. 1 in which an annular layer of limestone flux is provided with the central part being charged with a mixture of mineral and carbon. The values indicated are with respect to a ton of iron produced.

The materials charged in the central part of the furnace at ambient temperature comprise about 1.6 tons of mineral, the quantity of carbon being very variable.

Through the hood above the annular layer of limestone flux is withdrawn about 450 $Nm_3$ of fumes at a temperature of about 400° which are evacuated. This zone received a very small quantity of limestone flux at ambient temperature.

Through the central part of the furnace there is withdrawn about 2500$Nm^3$ of gas at a temperature between 200° and 300°.

The gases thus withdrawn are first washed to condense the tars and cooled, the amount of water being reduced to saturation at the lowest possible temperature. The highest possible ratio $H_2/H_2 + H_2O$ is maintained and at least 0.85.

Any excess of $CO_2$ in the gases can be eliminated by washing in an alkaline solution.

After treatment, the gases are reinjected at the base of the furnace through openings 44 at a temperature on the order of 60° the amount being about $1200Nm^3$. Through conduit 45 a variable quantity of gas is recycled to the burners, since, as has been seen, the temperature of the burners is controlled by the excess of cold gases in such a way that the temperature of combustion does not create hot points causing fusion of the materials. The ratio of the volumes could be, for example, about 14 volumes of gas for one volume of oxygen. The excess of gas is evacuated by conduit 16 by means of a ventilator.

At the base of the furnace, the materials leave at a temperature on the order of 180°, and variable quantities of chalk and coke are obtained and a ton of iron, the indicated values being with respect to this production.

Oxygen is injected at ambient temperature, the amount of $180Nm^3$ being injected principally in the central part while a certain quantity is introduced through tubes 16 with water vapor, this quantity being variable since, as has been seen, the temperature is controlled in the reforming zone for the gas above the reduction zone.

Figure 5:
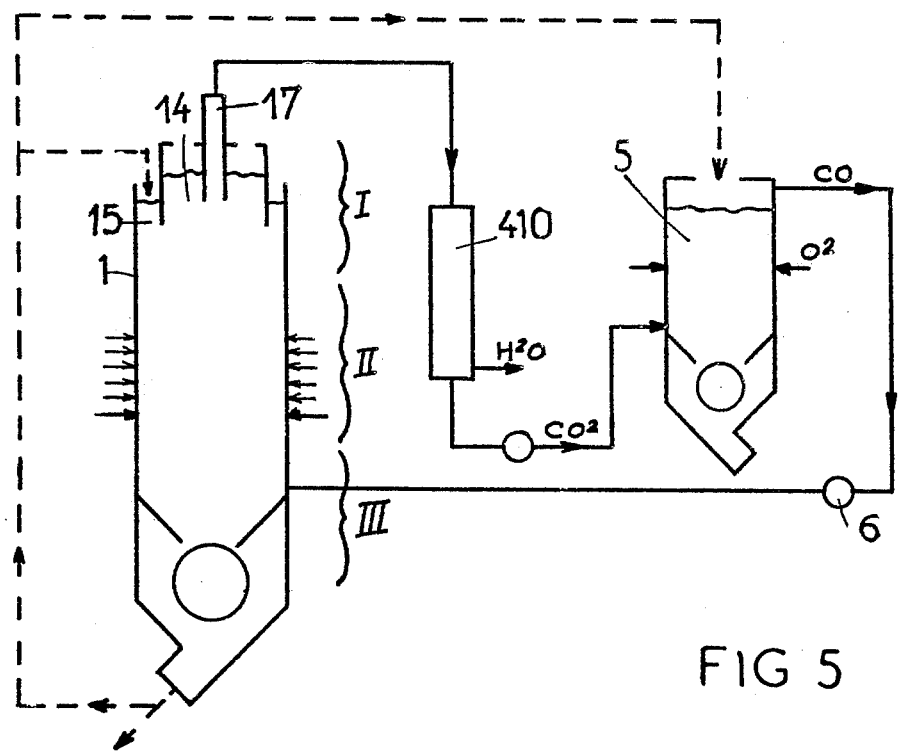
FIG. 5 is a general and schematic drawing of an installation for carrying out the process of the present invention.

The furnace as above described with several functional variations can be utilized in a more complete installation as shown in FIG. 5. In this embodiment the furnace is charged in the central zone 14 with a mixture of mineral and flamable carbon and an annular layer 15 of coke is formed by feed 12. Withdrawal of gases is at the central part of the furnace through a dome 17.

The gases withdrawn through the dome after washing and cooling in apparatus 410 enter a vertical furnace 5 for reforming of the gas. This furnace, of circular or rectangular section, is charged with coke, after magnetic separation, from the products leaving the first furnace. The central zone of reforming furnace 5 is fed with pure oxygen with an addition of water vapor in divided form and operates at high temperature. This temperature is so chosen that the gas from the furnace for reduction of the mineral, which contains a certain percentage of $CO_2$, undergoes a reduction by the carbon and is in greater part transformed to CO. The velocities of passage of the gas are determined so that the ratio $CO/CO + CO_2$ of the gas output is on the order of 0.90 and greater if necessary. The gas output is cold and is essentially constituted by CO and $H_2$. The ventilator 6 moves this gas without washing to the base of the furnace for reduction of the mineral. The excess of rich gas is directed to other uses.

In another embodiment of the principal furnace for the production of the mineral is fed with a mixture of 5% coke while utilizing the annular layer of coke which facilitates blowing in of pure oxygen. The charge is then preheated only by the sensible heat of the gases and there is no injection of secondary air. The gases removed from the furnace are, for the part to be recycled, taken to the reforming furnace without passing through a washer. The reforming furnace is fed with carbon in place of coke and pure oxygen is blown in with the addition of water vapor. The gases leaving the reforming furnace are detarred, washed and recycled to the principal treatment furnace.

The choice between the several methods of introduction of the charge in the reducing furnace and the system for reforming of the gases within the furnace or outside of the furnace depends upon the nature of the carbon and minerals to be treated.

It should be understood that the present invention is not limited to the details of the embodiments which have been described but include all variations and primarily those which differ only by the use of equivalent means.

Thus the term "iron mineral" employed herein can also refer to an agglomerated mineral. Further, the carbon can be replaced generally by a solid hydrocarbon product and the coke by any other solid reducing agent.

Further, the limestone flux forming the annular layer along the wall can be replaced by another nonfusible and nonaggressive body at 1400° with respect to the refractory such as chalk, magnesia or dolomite, for example.

What I claim is:

1. A substantially continuous process for the reduction of iron minerals in solid state in a vertical furnace comprising (1) charging the furnace substantially continuously with a mixture of particles of iron minerals and particles of solid carbonaceous combustible fuel containing large quantities of volatile hydrocarbons such that the mixture descends from top to bottom of the furnace by gravity, (2) injecting oxygen into the medial zone of the furnace as a plurality of fine jets distributed over the periphery of the furnace and over all of the height of the medial zone such that the oxygen ascends to the top of the furnace countercurrently to the mixture of solid particles, (3) withdrawing gases containing volatile components extracted from the mixture of particles produced at the top of the furnace, (4) washing and detarring the withdrawn gases and recycling the gases to the bottom of the furnace such that the gases ascend countercurrently to the mixture of solid particles, (5) withdrawing solids containing reduced iron and coke from the bottom of the furnace, wherein:

a. an upper zone is maintained in the furnace for heating the descending mixture of solid particles and cooling the ascending gases by countercurrent heat exchange, b. a medial zone is maintained in the furnace for heating and reducing the iron minerals, c. a lower zone is maintained in the furnace for heating the recycled gases and cooling the mixture of solids by countercurrent heat exchange, d. the oxygen is injected into the medial zone at a low velocity compared to the velocity of the ascending gases, e. the medial zone is heated by the combustion of at least a part of the ascending recycled gases and injected oxygen, f. the amount of oxygen injected into the medial zone is regulated to maintain a temperature therein between 950° C. and 1200° C., g. the amount of gases recycled to the bottom of the furnace is regulated whereby the upper and lower zones are in heat exchange equilibrium and the calorific mass of the gases is substantially equal to the calorific mass of the solids in each zone, h. the gases withdrawn at the top of the furnace are at a temperature of less than 100° C., and i. the solids withdrawn from the bottom of the furnace are at a temperature of less than 100° C.

2. The process of claim 1 wherein at least a portion of the gases recycled to the bottom of the furnace is injected with the oxygen into the medial zone to control the temperature of combustion.

3. The process of claim 1 wherein the solid carbonaceous combustible fuel contains flammable carbon and is burned in the upper zone to form gaseous hydrocarbons which are subsequently cracked in the lower zone to form hydrogen and carbon monoxide.

4. The process of claim 1 wherein a large part of the carbonic gas and water vapor formed during combustion are transformed to carbon monoxide and hydrogen at the bottom of the upper zone.

5. The process of claim 1 wherein a layer of material neutral when hot with respect to the walls of the furnace is annularly disposed along the walls of the furnace.

6. The process of claim 1 wherein the mineral is charged centrally at the top of the furnace and the fuel is charged as an annulus surrounding the mineral charge.

7. The process of claim 1 wherein a layer of solid reducing agent is annularly disposed along and against the walls of the furnace, between the charged mixture of particles and the walls of the furnace and the gases are centrally withdrawn at the top of the furnace.

8. The process of claim 5 wherein the mineral is injected at the base of the annularly disposed layer.

* * * * *